United States Patent
Ohguro

(10) Patent No.: US 11,605,868 B2
(45) Date of Patent: Mar. 14, 2023

(54) ISOLATOR

(71) Applicants: Kabushiki Kaisha Toshiba, Tokyo (JP); Toshiba Electronic Devices & Storage Corporation, Tokyo (JP)

(72) Inventor: Tatsuya Ohguro, Kanazawa Ishikawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 16 days.

(21) Appl. No.: 17/468,531

(22) Filed: Sep. 7, 2021

(65) Prior Publication Data

US 2022/0302569 A1  Sep. 22, 2022

(30) Foreign Application Priority Data

Mar. 19, 2021  (JP) .............................. JP2021-046018

(51) Int. Cl.
*H01P 1/36* (2006.01)
*H01F 27/32* (2006.01)
*H04B 1/18* (2006.01)

(52) U.S. Cl.
CPC ............... *H01P 1/36* (2013.01); *H01F 27/32* (2013.01); *H04B 1/18* (2013.01)

(58) Field of Classification Search
CPC ............. H01P 1/36; H01F 27/32; H04B 1/18
See application file for complete search history.

(56) References Cited

U.S. PATENT DOCUMENTS

| 3,987,861 | A | 10/1976 | Smith et al. |
| 9,064,827 | B2 * | 6/2015 | Fujii ................... H01L 27/3246 |
| 9,935,098 | B2 | 4/2018 | Palumbo |
| 11,189,559 | B2 * | 11/2021 | Yu ........................... H01L 28/60 |
| 2018/0130867 | A1 | 5/2018 | Lambkin et al. |
| 2020/0294786 | A1 | 9/2020 | Yamada |

FOREIGN PATENT DOCUMENTS

| JP | 6091206 B2 | 3/2017 |
| JP | 2019-062084 A1 | 4/2019 |
| JP | 2020-150241 A | 9/2020 |

* cited by examiner

*Primary Examiner* — John W Poos
*Assistant Examiner* — Tyler J Pereny
(74) *Attorney, Agent, or Firm* — Allen & Overy LLP

(57) ABSTRACT

An isolator includes a lower electrode, a first insulating layer, a second insulating layer, an upper electrode, and a low permittivity portion. The first insulating layer is provided on the lower electrode, and includes a protruding portion in an upper portion of the first insulating layer. The second insulating layer is provided on the protruding portion, extends sideways from a region directly above the protruding portion, and has a specific permittivity higher than a specific permittivity of the first insulating layer. The upper electrode is in contact with an upper surface of the second insulating layer. The low permittivity portion is in contact with a side surface of the protruding portion and a lower surface of the second insulating layer. The low permittivity portion has a specific permittivity lower than the specific permittivity of the first insulating layer.

14 Claims, 11 Drawing Sheets

ISOLATOR

CROSS-REFERENCE TO RELATED APPLICATIONS

This application is based upon and claims the benefit of priority from Japanese Patent Application No. 2021-046018, filed on Mar. 19, 2021; the entire contents of which are incorporated herein by reference.

FIELD

Embodiments relate to an isolator.

BACKGROUND

An isolator in which signals are transmitted or received by dielectric coupling or capacitive coupling between two electrodes has a single structure including one set of the electrodes, so that the structure can be simplified and the performance of transmitting signals can be improved. However, since most of an applied voltage is applied between the one set of electrodes, an improvement in reliability of the electrodes under high voltage has become an issue.

DETAILED DESCRIPTION

Figure 1:
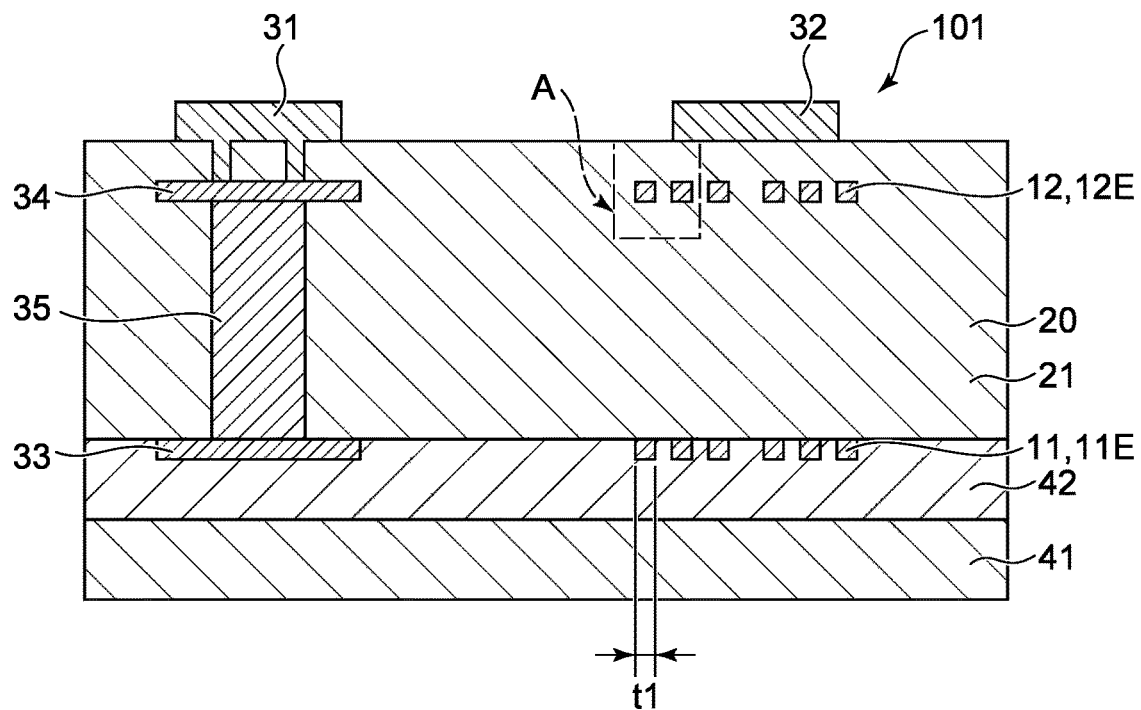
FIG. 1 is a cross-sectional view showing an isolator according to a first embodiment.

An isolator according to one embodiment, includes a lower electrode, a first insulating layer, a second insulating layer, an upper electrode, and a low permittivity portion. The first insulating layer is provided on the lower electrode, and includes a protruding portion in an upper portion of the first insulating layer. The second insulating layer is provided on the protruding portion, extends sideways from a region directly above the protruding portion, and has a specific permittivity higher than a specific permittivity of the first insulating layer. The upper electrode is in contact with an upper surface of the second insulating layer. The low permittivity portion is in contact with a side surface of the protruding portion and a lower surface of the second insulating layer. The low permittivity portion has a specific permittivity lower than the specific permittivity of the first insulating layer.

Hereafter, each embodiment will be described with reference to the drawings.

Incidentally, the drawings are schematic, and the relationship between the thickness and the width of each portion, the ratio of the size between portions, and the like are not necessarily limited to being the same as actual ones. In addition, even when portions indicate the same portion, the dimensions or ratios of the portions may be shown differently depending on the drawing. In addition, in the specification and each drawing, the same components as those described related to the previous drawings are denoted by the same reference signs, and detailed descriptions are appropriately omitted.

First Embodiment

FIG. 1 is a cross-sectional view showing an isolator according to the embodiment.

Figure 2:
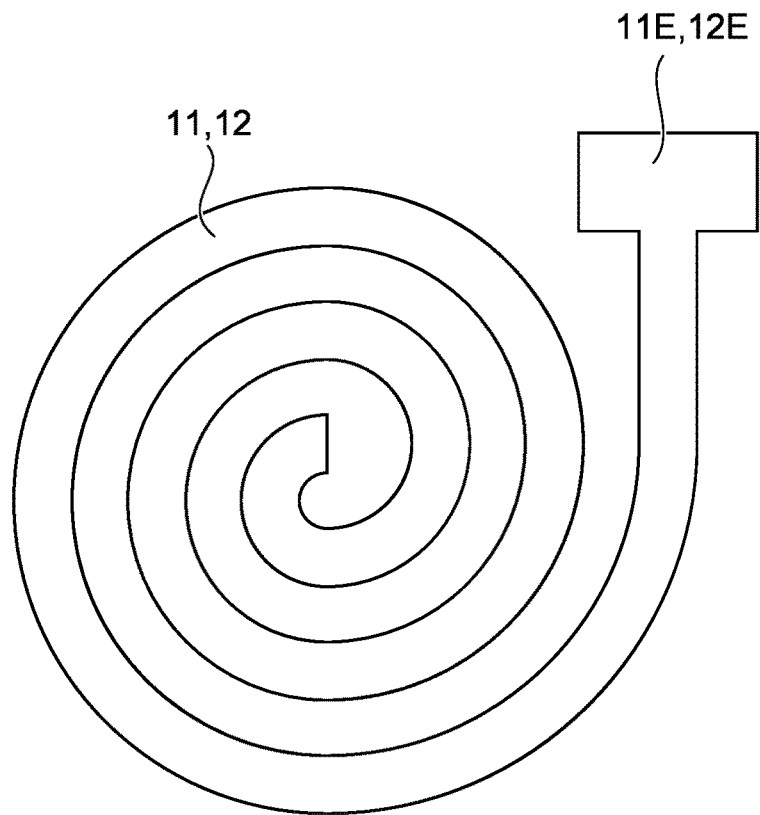
FIG. 2 is a plan view showing a lower electrode and an upper electrode.

FIG. 2 is a plan view showing a lower electrode and an upper electrode.

Figure 3:
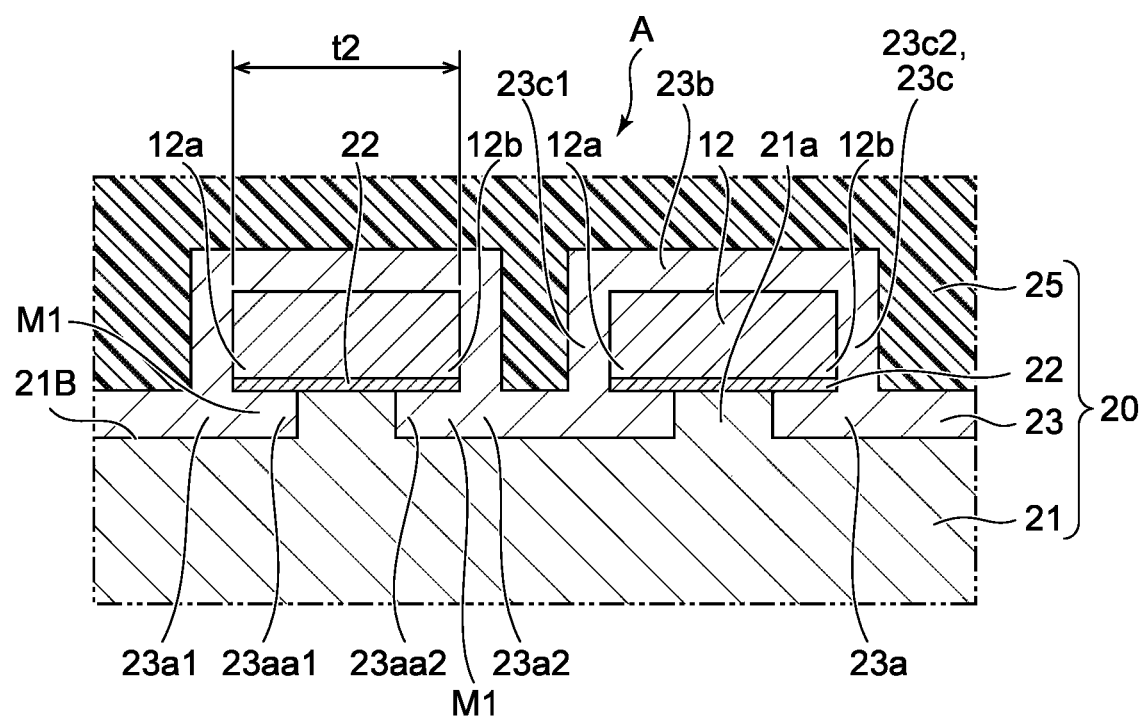
FIG. 3 is an enlarged cross-sectional view showing a region A in FIG. 1.

FIG. 3 is an enlarged cross-sectional view showing a region A in FIG. 1.

As shown in FIG. 1, an isolator 101 includes a silicon substrate 41, an insulating interlayer 42, a composite insulating layer 20, a first pad 31, a second pad 32, a lower electrode 11E, an upper electrode 12E, a lower wiring 33, an upper wiring 34, and a via plug 35. The isolator 101 is, for example, a digital isolator.

The silicon substrate 41 forms a lower surface of the isolator 101. The insulating interlayer 42 is provided on the silicon substrate 41. The lower wiring 33 and the lower electrode 11E are provided in an upper portion of the insulating interlayer 42, and are connected to each other. The composite insulating layer 20 is provided on the insulating interlayer 42. The upper electrode 12E and the upper wiring 34 are provided in an upper portion of the composite insulating layer 20. As shown in FIG. 1, the composite insulating layer 20 provides insulation between the lower electrode 11E and the upper electrode 12E.

As shown in FIG. 1, the via plug 35 is provided inside the composite insulating layer 20, a lower end of the via plug 35 is connected to the lower wiring 33, and an upper end thereof is connected to the upper wiring 34. The upper wiring 34 is connected to the first pad 31.

The lower electrode 11E is connected to the first pad 31 via the lower wiring 33, the via plug 35, and the upper wiring 34. The upper electrode 12E is connected to the second pad 32.

As shown in FIG. 1, the first pad 31 and the second pad 32 are provided on the composite insulating layer 20, and are exposed to the outside. The first pad 31 and the second pad 32 are connected to different respective external devices.

As shown in FIG. 2, the lower electrode 11E and the upper electrode 12E are made of a conductor, and contain, for example, copper (Cu). The lower electrode 11E and the upper electrode 12E have a long shape, and include coil portions 11 and 12, respectively, which are formed in a spiral shape when viewed from above. The coil portion 12 of the upper electrode 12E is provided to overlap the coil portion 11 of the lower electrode 11E when viewed from above.

Each of the coil portions 11 and 12 has a lower surface, an upper surface, an outer side surface, and an inner side surface that have a spiral shape.

Here, for convenience of description, in the specification, as shown in FIGS. 1 and 2, when viewed from above, a direction toward the center of the entirety of the coil portion 12 is referred to as an inward side, a direction toward an opposite side is referred to as an outward side, a side surface toward the inward side in each configuration is referred to as an inner side surface, and a side surface toward the outward side is referred to as an outer side surface. In addition, a direction from the coil portion 11 toward the coil portion 12 is referred to as an "upper side", and a direction opposite thereto is referred to as a "lower side"; however, the expressions are merely expedient and have nothing to do with the direction of gravity. The length in an up-down direction is also referred to as "thickness" or "height". The "width" of each configuration is, unless otherwise specified, a length in a direction perpendicular to a longitudinal direction and the up-down direction of each configuration.

A lower portion of the upper electrode 12E contains, for example, titanium (Ti) or titanium nitride (TiN) as a barrier layer. As shown in FIG. 3, in the coil portion 12 of the upper electrode 12E, a portion including a corner between the outer side surface and the lower surface is an outer lower corner portion 12a, and a portion including a corner between the inner side surface and the lower surface is an inner lower corner portion 12b.

As shown in FIG. 3, a width t2 of the coil portion 12 is, for example, 3 μm. As shown in FIG. 1, a width t1 of the coil portion 11 of the lower electrode 11E is, for example, 3 μm.

As shown in FIG. 3, the composite insulating layer 20 includes a first insulating layer 21, a second insulating layer 22, a third insulating layer 23, and a protective insulating layer 25. As shown in FIGS. 1 and 3, the first insulating layer 21 is provided on the lower electrode 11E and the insulating interlayer 42, and is provided below the upper electrode 12E.

A protruding portion 21a is provided in an upper portion of the first insulating layer 21. The protruding portion 21a has, similar to the coil portion 12 of the upper electrode 12E, for example, a spiral shape when viewed from above. As shown in FIG. 3, an upper surface, an outer side surface, and an inner side surface of the protruding portion 21a form a part of an upper surface 21B of the first insulating layer 21. The protruding portion 21a is provided, for example, in a region directly below the coil portion 12, the region excluding regions directly below the outer lower corner portion 12a and the inner lower corner portion 12b of the coil portion 12.

The first insulating layer 21 contains, for example, silicon oxide (SiO). The specific permittivity of the first insulating layer 21 is, for example, 4.1.

The second insulating layer 22 has, similar to the coil portion 12 of the upper electrode 12E, for example, a spiral shape when viewed from above. As shown in FIG. 3, the second insulating layer 22 is provided on the protruding portion 21a, and a lower surface of the second insulating layer 22 is in contact with the upper surface of the protruding portion 21a. The second insulating layer 22 has a substantially thin plate shape extending sideways from a region directly above the protruding portion 21a. A space surrounded by the lower surface of the second insulating layer 22, the side surface of the protruding portion 21a, and a region on the upper surface 21B of the first insulating layer 21, the region being in contact with the side surface of the protruding portion 21a, is a groove M1.

As shown in FIG. 3, the second insulating layer 22 is provided, for example, in a region directly below the coil portion 12. When viewed from above, the region in which the second insulating layer 22 is provided is substantially the same as the region directly below the coil portion 12. An outer side surface of the second insulating layer 22 is provided in a region directly below the outer side surface of the coil portion 12.

An upper surface of the second insulating layer 22 is in contact with the lower surface of the coil portion 12, and is in contact with the outer lower corner portion 12a and the inner lower corner portion 12b of the coil portion 12. The width of the second insulating layer 22 is, for example, substantially the same as the width of the coil portion 12. The thickness of the second insulating layer 22 is, for example, 0.5 μm.

The second insulating layer 22 contains, for example, nitrogen (N) and silicon (Si), and contains, for example, silicon nitride (SiN). The specific permittivity of the second insulating layer 22 is higher than the specific permittivity of the first insulating layer 21. The specific permittivity of the second insulating layer 22 is, for example, 7. In addition, the internal stress of the second insulating layer 22 is higher than the internal stress of the first insulating layer 21, and is higher than the internal stress of the third insulating layer 23.

As shown in FIG. 3, the third insulating layer 23 covers the first insulating layer 21, the second insulating layer 22, and the coil portion 12. The third insulating layer 23 includes a bottom portion 23a, an upper portion 23b, and a side portion 23c. The bottom portion 23a is provided on the upper surface 21B of the first insulating layer 21, and is in contact with the upper surface 21B.

As shown in FIG. 3, the bottom portion 23a of the third insulating layer 23 includes an outer bottom portion 23a1 provided on the outward side with respect to the coil portion 12, and an inner bottom portion 23a2 provided on the inward side. An end portion 23aa1 (low permittivity portion in the claims) on an inward side of the outer bottom portion 23a1 is in contact with the outer side surface of the protruding portion 21a and the lower surface of the second insulating layer 22. The end portion 23aa1 is provided in a region directly below the outer lower corner portion 12a of the coil portion 12.

An end portion 23aa2 (low permittivity portion in the claims) on an outward side of the inner bottom portion 23a2 is in contact with the inner side surface of the protruding portion 21a of the first insulating layer 21 and the lower surface of the second insulating layer 22. The end portion 23aa2 is provided in a region directly below the inner lower corner portion 12b of the coil portion 12.

The end portions 23aa1 and 23aa2 are provided inside the groove M1. The thicknesses of the end portions 23aa1 and 23aa2 are substantially the same as the height of the protruding portion 21a of the first insulating layer 21. The end portions 23aa1 and 23aa2 do not contain, for example, a void. The thickness of the end portion 23aa1 and 23aa2 is, for example, 1.5 μm.

The side portion 23c of the third insulating layer 23 includes an outer wall portion 23c1 and an inner wall portion 23c2. The outer wall portion 23c1 is in contact with a top of an adjacent portion on an outward side of the end portion 23aa1 in the outer bottom portion 23a1. The outer wall portion 23c1 is provided outward of the outer side surface of the second insulating layer 22 and the outer side surface of the coil portion 12, and is in contact with the outer side surface of the second insulating layer 22 and the outer side surface of the coil portion 12.

The inner wall portion 23c2 is in contact with a top of an adjacent portion on an inward side of the end portion 23aa2 in the inner bottom portion 23a2. The inner wall portion 23c2 is provided inward of an inner side surface of the second insulating layer 22 and the inner side surface of the coil portion 12, and is in contact with the inner side surface of the second insulating layer 22 and the inner side surface of the coil portion 12.

The upper portion 23b of the third insulating layer 23 is in contact with an upper end of the outer wall portion 23c1 and an upper end of the inner wall portion 23c2. The upper portion 23b is provided on the coil portion 12, and is in contact with the upper surface of the coil portion 12.

As shown in FIG. 3, the thickness of the outer wall portion 23c1 of the third insulating layer 23 which is a length in an inward-outward direction is substantially the same as the thickness of the inner wall portion 23c2 which is a length in the inward-outward direction. The thickness of the outer wall portion 23c1 is substantially the same as the thickness of the upper portion 23b. The thickness of the outer bottom portion 23a1 is substantially the same as the thickness of the inner bottom portion 23a2. The thickness of the outer bottom portion 23a1 is, for example, substantially the same as the thickness of the outer wall portion 23c1, and is larger than the thickness of the second insulating layer 22. The width of the end portions 23aa1 and 23aa2 of the third insulating layer 23 is, for example, 20 nm or more, for example, from 10 to 20 nm.

The third insulating layer 23 contains, for example, at least one of fluorinated silicon oxide (SiOF or fluorine doped silicate glass: FSG), organic coated glass (Spin on Glass: SOG), carbon-added silicon oxide (SiOC), an aromatic organic resin such as SiLK (registered trademark), and benzocyclobutene (BCB). The specific permittivity of the third insulating layer 23 is lower than the specific permittivity of the first insulating layer 21. The specific permittivity of the third insulating layer 23 is, for example, 2.0.

As shown in FIG. 3, the protective insulating layer 25 is provided in an upper portion of the composite insulating layer 20, and is provided on the third insulating layer 23. The first pad 31 and the second pad 32 are exposed on the protective insulating layer 25. The protective insulating layer 25 contains, for example, silicon oxide or polyimide.

Hereinafter, the operation of the isolator according to the embodiment will be described.

In the isolator 101, an output terminal or an input terminal of one external device is connected to the first pad 31, and an input terminal or an output terminal of another external device is connected to the second pad 32. For example, a voltage of 500 V is applied between the first pad 31 and the second pad 32. Accordingly, in the isolator 101, dielectric coupling between the coil portion 11 of the lower electrode 11E and the coil portion 12 of the upper electrode 12E causes signals to be transmitted and received between the one external device and the another external device.

At this time, for example, a voltage of 500 V is applied between the coil portions 11 and 12, and the electric field intensity tends to increase in the outer lower corner portion 12a of the coil portion 12. In the isolator 101, the voltage applied to a predetermined portion directly below the coil portion 12 is adjusted to reduce the electric field intensity of the second insulating layer 22 in contact with the lower surface of the coil portion 12 and relax the electric field intensity in the outer lower corner portion 12a of the coil portion 12.

In detail, the second insulating layer 22 and the third insulating layer 23 that differ from each other in specific permittivity and thickness are disposed on the first insulating layer 21 in the predetermined portion directly below the coil portion 12, so that the voltage applied to the predetermined portion is divided and applied to the second insulating layer 22, the third insulating layer 23, and the first insulating layer 21. The divided voltage is determined from the relationship between the thickness and the specific permittivity of each of the first insulating layer 21, the second insulating layer 22, and the third insulating layer 23 in the predetermined portion.

Among the first insulating layer 21, the second insulating layer 22, and the third insulating layer 23, since the divided voltage applied to the first insulating layer 21 is the largest but the first insulating layer 21 is thickest, the electric field intensity of the first insulating layer 21 has an intermediate value. The divided voltage applied to the third insulating layer 23 that has a low specific permittivity and is thinner than the first insulating layer 21 is the second largest after the first insulating layer 21, but the electric field intensity is the largest in the predetermined portion. The divided voltage applied to the second insulating layer 22 that has a high specific permittivity and is the thinnest in the predetermined portion is the smallest, and the electric field intensity is also the smallest in the predetermined portion. In such a manner, the electric field intensity of the second insulating layer 22 provided directly below the coil portion 12 is decreased, so that the electric field intensity in the outer lower corner portion 12a of the coil portion 12 can be relaxed.

Hereinafter, a method for manufacturing the isolator 101 according to the embodiment will be described.

FIGS. 4A to 4C and FIGS. 5A and 5B are schematic views showing the method for manufacturing the isolator according to the embodiment.

First, as shown in FIG. 1, the silicon substrate 41 is prepared, and elements such as transistors are formed. Next, the insulating interlayer 42 is formed on the silicon substrate 41. The insulating interlayer 42 is formed, for example, by using a chemical vapor deposition method (CVD method).

Next, for example, the lower wiring 33 and the lower electrode 11E are formed in the upper portion of the insulating interlayer 42.

Next, the first insulating layer 21 is formed on the insulating interlayer 42, the lower wiring 33, and the lower electrode 11E. The first insulating layer 21 is formed, for example, by a CVD method using plasma.

Figure 4A:
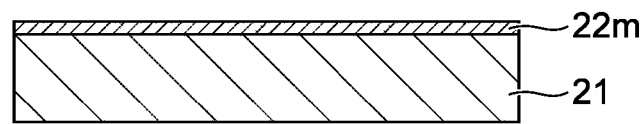
FIGS. 4A to 4C and FIGS. 5A and 5B are schematic views showing a method for manufacturing the isolator according to the first embodiment.

As shown in FIG. 4A, a high dielectric film 22m is formed on the first insulating layer 21. The high dielectric film 22m contains, for example, silicon nitride (SiN), and is formed, for example, by the plasma CVD method.

Next, the via plug 35 (refer to FIG. 1) is formed by etching a predetermined place in the composite insulating layer 20.

Figure 4B:
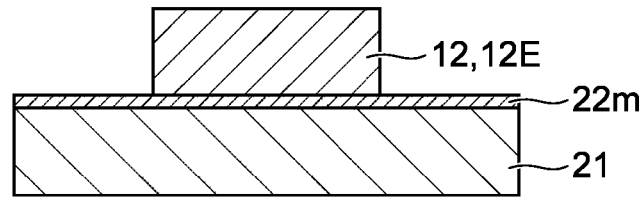

As shown in FIG. 4B, the upper electrode 12E is formed. Accordingly, the coil portion 12 is formed on the high dielectric film 22m. When the upper electrode 12E is formed, for example, the upper wiring 34 is also formed at the same time. The upper wiring 34 and the upper electrode 12E are formed, for example, by sputtering and plating.

Figure 4C:
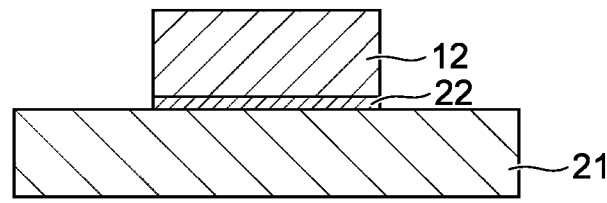

As shown in FIG. 4C, portions in the high dielectric film 22m other than a region directly below the upper electrode 12E are removed to form the second insulating layer 22, for example, by masking the upper electrode 12E and etching the high dielectric film 22m. The removal of the high dielectric film 22m is performed, for example, by anisotropic etching such as reactive ion etching (RIE).

Figure 5A:
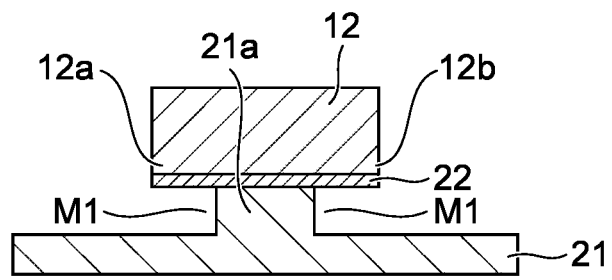

As shown in FIG. 5A, a part of the upper portion of the first insulating layer 21 is removed by masking the upper electrode 12E and the second insulating layer 22 and applying isotropic etching. Accordingly, the protruding portion 21a is formed in the upper portion of the first insulating layer 21. The isotropic etching for forming the protruding portion 21a is, for example, wet etching or chemical dry etching. The removed portions in the upper portion of the first insulating layer 21 include, for example, portions other than the region directly below the coil portion 12 and portions in the regions directly below the outer lower corner portion 12a and the inner lower corner portion 12b of the coil portion 12. In addition, accordingly, the grooves M1 are also formed beside the protruding portion 21a.

Figure 5B:
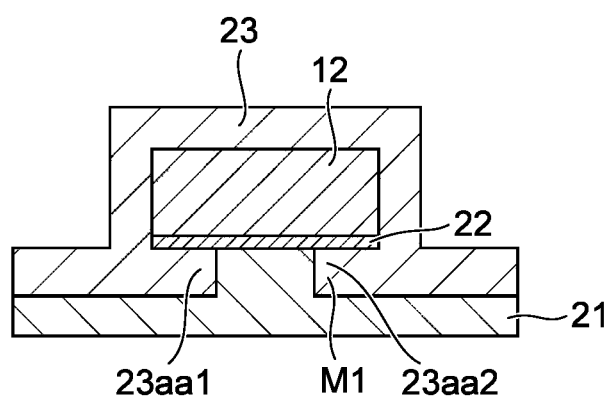

As shown in FIG. 5B, the third insulating layer 23 is formed on the first insulating layer 21 and the coil portion 12. The third insulating layer 23 is formed, for example, by the plasma CVD method. The end portions 23aa1 and 23aa2 are formed not to contain, for example, a void. Accordingly, the end portion 23aa1 and 23aa2 are formed in the respective grooves M1, and are formed in the regions directly below the outer lower corner portion 12a and the inner lower corner portion 12b of the coil portion 12.

As shown in FIG. 3, the protective insulating layer 25 is formed on the third insulating layer 23 by the plasma CVD method.

Next, as shown in FIG. 1, the first pad 31 and the second pad 32 are formed on the protective insulating layer 25.

As described above, the isolator 101 according to the embodiment is manufactured.

Hereinafter, effects of the isolator 101 according to the embodiment will be described.

Since the isolator 101 according to the embodiment has a single structure in which signals are transmitted and received by dielectric coupling of a set of the coil portions 11 and 12, the coupling coefficient is further increased and the transfer efficiency is further improved than an isolator having a double structure including two sets of coil portions connected in series to each other. Meanwhile, since voltage is applied to one set of the coil portions 11 and 12 in a concentrated manner, the electric field of the outer lower corner portion 12a of the coil portion 12 is likely to increase, but the electric field of the second insulating layer 22 disposed directly below the outer lower corner portion 12a is reduced and the electric field of the outer lower corner portion 12a is relaxed by adjusting the divided voltage below the outer lower corner portion 12a of the coil portion 12. Accordingly, the breakage of the coil portion 12 can be suppressed, and the reliability of the isolator 101 can be improved.

In addition, in the isolator 101 according to the embodiment, the thickness of the second insulating layer 22 containing silicon nitride having high internal stress is thinner than those of the first insulating layer 21 and the third insulating layer 23, and the second insulating layer 22 is partially provided below the coil portion 12. Accordingly, the warpage of the isolator 101 caused by internal stress can be suppressed.

When the second insulating layer 22 and the third insulating layer 23 are not provided in a predetermined region directly below the coil portion 12, and only the first insulating layer 21 is provided, the electric field intensity in the first insulating layer 21 is not reduced, and the electric field intensity in the lower surface of the coil portion 12 is not relaxed by the specific permittivity and the thickness. For this reason, the electric field is concentrated in the region directly below the outer lower corner portion 12a, and insulation breakdown is likely to occur.

In addition, when in the predetermined portion, the second insulating layer 22 is not provided and the first insulating layer 21 and the third insulating layer 23 that has a lower specific permittivity and is thinner than the first insulating layer 21 are provided, the voltage is divided also in the third insulating layer 23, but from the relationship between the specific permittivity and the thickness, the electric field intensity in the third insulating layer 23 is higher than when only the first insulating layer 21 is provided.

On the other hand, in the isolator 101 according to the embodiment, since the second insulating layer 22 is further provided between the coil portion 12 and the third insulating layer 23, in the second insulating layer 22, the voltage to be divided is decreased and the electric field intensity is reduced from the relationship between the specific permittivity and the thickness.

In the isolator 101 according to the embodiment, the second insulating layer 22 contains silicon nitride, but may contain other substances having a high specific permittivity instead of containing silicon nitride. Specifically, the second insulating layer 22 may contain, for example, hafnium (Hf), lanthanum (La), magnesium (Mg), or yttrium (Y).

In the isolator 101 according to the embodiment, the upper portion 23b of the third insulating layer 23 may not be provided, and for example, the protective insulating layer 25 may cover the coil portion 12 of the protective insulating layer 25.

In addition, the second insulating layer 22 and the third insulating layer 23 each are substantially symmetrically provided outward and inward of the coil portion 12, but may be provided at least below the outer lower corner portion 12a of the coil portion 12, and for example, may not be provided below the inner lower corner portion 12b. As shown in FIG. 3, the protruding portion 21a is provided in the region directly below the coil portion 12, the region excluding the outer lower corner portion 12a and the inner lower corner portion 12b. The protruding portion 21a may be provided in a region directly below the coil portion 12, the region excluding only the outer lower corner portion 12a.

In addition, in the isolator 101 according to the embodiment, the lower electrode 11E and the upper electrode 12E include the coil portions 11 and 12, respectively, and signals are transmitted and received by dielectric coupling; however, the invention is not limited thereto. For example, the lower electrode 11E and the upper electrode 12E may not include the coil portions 11 and 12, respectively, and signals may be transmitted by capacitive coupling between the lower electrode 11E and the upper electrode 12E. In this case, for example, the second insulating layer 22, the third insulating layer 23, and the first insulating layer 21 may be provided directly below a lower corner portion of a portion to be capacitively coupled in the upper electrode 12E.

In addition, the first insulating layer 21 contains silicon oxide, but may contain other substances instead of containing silicon oxide. The first insulating layer 21 may contain, for example, silicon oxynitride (SiON) and hydrogen. In this case, since the internal stress of silicon oxynitride and hydrogen is, for example, 1/40 or less of the internal stress of the silicon nitride, the internal stress of the composite insulating layer 20 can be reduced. The specific permittivity of the first insulating layer 21 containing silicon oxynitride and hydrogen is, for example, 4.8.

In addition, the composite insulating layer 20 may include an insulating layer other than the first insulating layer 21, the second insulating layer 22, the third insulating layer 23, and the protective insulating layer 25.

First Variation of First Embodiment

In the groove M1 of an isolator 101a according to the variation, the third insulating layer 23 is not disposed and a gap G1 is disposed as a low permittivity portion. The gap G1 is filled with gas. The gas is, for example, atmospheric gas when the third insulating layer 23 is formed.

Figure 6:
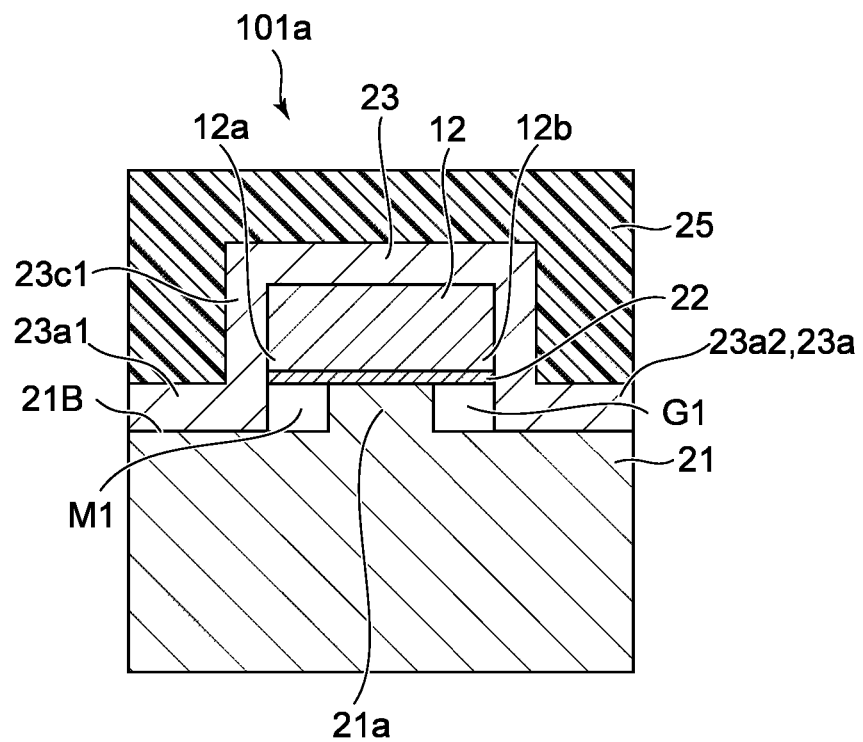
FIG. 6 is an enlarged cross-sectional view showing an isolator according to a variation of the first embodiment.

FIG. 6 is an enlarged cross-sectional view showing the isolator according to the variation.

As shown in FIG. 6, a lower end of the outer wall portion 23c1 is in contact with a top of an inward end edge of the outer bottom portion 23a1 of the third insulating layer 23. An inner side surface of the outer bottom portion 23a1 is located, for example, in a region directly below the outer side surface of the second insulating layer 22, or slightly inward of the region directly therebelow.

A lower end of the inner wall portion 23c2 is in contact with a top of an outward end edge of the inner bottom portion 23a2 of the third insulating layer 23. An outer side surface of the inner bottom portion 23a2 is located, for example, in a region directly below the inner side surface of the second insulating layer 22, or slightly outward of the region directly therebelow.

The gap G1 is provided between the lower surface of the second insulating layer 22 and the upper surface of the first insulating layer 21, and is provided in a region directly below the second insulating layer 22. The gap G1 is provided outward and inward of the protruding portion 21a. The gap G1 is provided between the bottom portion 23a of the third insulating layer 23 and the protruding portion 21a.

For example, the gap G1 is in contact with the side surface of the protruding portion 21a of the first insulating layer 21, the lower surface of the second insulating layer 22, and the third insulating layer 23. The gap G1 on the outward side is in contact with the outer side surface of the protruding portion 21a and the inner side surface of the outer bottom portion 23a1 of the third insulating layer 23. The gap G1 on the outward side is provided in the region directly below the outer lower corner portion 12a of the coil portion 12, and is provided in a region substantially directly below the outer side surface of the coil portion 12. The gap G1 on the outward side may be provided, for example, slightly inward of the region directly below the outer side surface of the second insulating layer 22.

The gap G1 on the inward side is in contact with the inner side surface of the protruding portion 21a and the outer side surface of the inner bottom portion 23a2 of the third insulating layer 23. The gap G1 on the inward side is provided in the region directly below the inner lower corner portion 12b of the coil portion 12, and is provided in a region substantially directly below the inner side surface of the coil portion 12. The gap G1 on the inward side may be provided, for example, slightly outward of the region directly below the inner side surface of the second insulating layer 22.

The thickness of the gap G1 is, for example, 1/10 or less of an interval between the coil portion 11 and the coil portion 12. The specific permittivity of the gap G1 is lower than the specific permittivity of the third insulating layer 23. The specific permittivity of the gap G1 is, for example, 1.

The gap G1 of the isolator 101a according to the variation is formed by causing a void to remain in the groove M1 when the third insulating layer 23 is formed.

In the isolator 101a according to the variation, since the gaps G1 having a lower specific permittivity than the third insulating layer 23 are disposed in the respective grooves M1, similar to the first embodiment, the electric field of the second insulating layer 22 directly below the outer lower corner portion 12a of the coil portion 12 can be relaxed, and the breakage of the outer lower corner portion 12a of the coil portion 12 can be suppressed.

In addition, since the thickness of the gap G1 is set to, for example, 1/10 of the interval between the coil portion 11 and the coil portion 12 between which insulation is provided by the composite insulating layer 20, or a length slightly smaller than 1/10, the breakdown voltage can be improved.

Configurations, operations, and effects other than those described above in the variation are the same as those of the first embodiment.

Second Embodiment

The second insulating layer 22 of an isolator 102 according to the embodiment is in contact with the lower surface and the side surfaces of the coil portion 12 of the upper electrode 12E.

Figure 7:
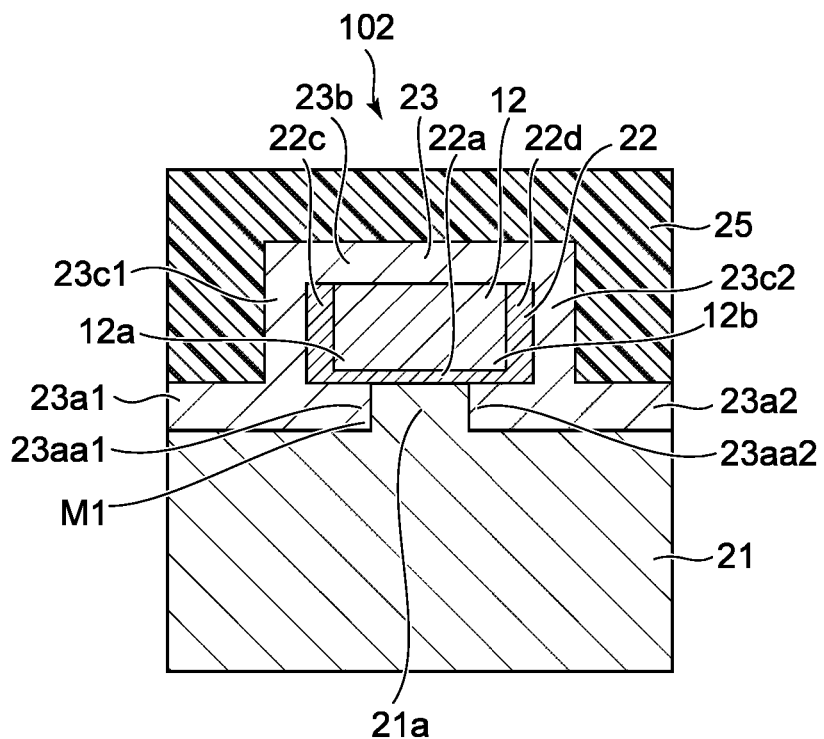
FIG. 7 is an enlarged cross-sectional view showing an isolator according to a second embodiment.

FIG. 7 is an enlarged cross-sectional view showing the isolator according to the embodiment.

The second insulating layer 22 includes a bottom portion 22a, an outer wall portion 22c, and an inner wall portion 22d.

A lower end of the outer wall portion 22c is in contact with a top of an outward end portion of the bottom portion 22a. The outer wall portion 22c is provided outward of the coil portion 12, and is in contact with the outer side surface of the coil portion 12. The bottom portion 22a and the outer wall portion 22c of the second insulating layer 22 cover the outer lower corner portion 12a of the coil portion 12, and are in contact with the outer lower corner portion 12a. In the bottom portion 22a, a portion located inward of a portion in contact with the outer wall portion 22c is located in the region directly below the outer lower corner portion 12a of the coil portion 12.

A lower end of the inner wall portion 22d of the second insulating layer 22 is in contact with an inward end portion of the bottom portion 22a. The inner wall portion 22d is provided inward of the coil portion 12, and is in contact with the inner side surface of the coil portion 12. The bottom portion 22a and the inner wall portion 22d of the second insulating layer 22 cover the inner lower corner portion 12b of the coil portion 12, and are in contact with the inner lower corner portion 12b. In the bottom portion 22a, a portion located outward of a portion in contact with the inner wall portion 22d is located in the region directly below the inner lower corner portion 12b of the coil portion 12.

The thickness of the outer wall portion 22c of the second insulating layer 22 which is a length in the inward-outward direction is, for example, substantially the same as the thickness of the inner wall portion 22d which is a length in the inward-outward direction. The thickness of the outer wall portion 22c and the thickness of the inner wall portion 22d increase, for example, toward the lower side, and the thickness of a lower portion is slightly larger than the thickness of an upper portion. The thickness of the outer wall portion 22c is, for example, equal to or more than the thickness of the bottom portion 22a.

The width of the groove M1 on the outward side is larger than the width of the groove M1 on the outward side in the first embodiment by the thickness of the outer wall portion 22c of the second insulating layer 22. The width of the groove M1 on the inward side is larger than the width of the groove M1 on the inward side in the first embodiment by the thickness of the inner wall portion 22d of the second insulating layer 22.

The outer wall portion 23c1 of the third insulating layer 23 is provided outward of the outer wall portion 22c of the second insulating layer 22, and is in contact with the outer wall portion 22c. The inner wall portion 23c2 of the third insulating layer 23 is provided inward of the inner wall portion 22*d* of the second insulating layer 22, and is in contact with the inner wall portion 22*d*.

The end portion 23*aa*1 (low permittivity portion in the claims) on the inward side of the outer bottom portion 23*a*1 of the third insulating layer 23 is in contact with the outer side surface of the protruding portion 21*a* and the lower surface of the second insulating layer 22. When viewed from above, the end portion 23*aa*1 is provided in a region directly below the outer wall portion 22*c* of the second insulating layer 22 and the region directly below the outer lower corner portion 12*a* of the coil portion 12.

The end portion 23*aa*2 (low permittivity portion in the claims) on the outward side of the inner bottom portion 23*a*2 of the third insulating layer 23 is in contact with the inner side surface of the protruding portion 21*a* and the lower surface of the second insulating layer 22. When viewed from above, the end portion 23*aa*2 is provided in a region directly below the inner wall portion 22*d* of the second insulating layer 22 and the region directly below the inner lower corner portion 12*b* of the coil portion 12.

The upper portion 23*b* of the third insulating layer 23 is provided on the coil portion 12 and on the outer wall portion 23*c*1 and the inner wall portion 23*c*2 of the third insulating layer 23, and is in contact with the upper surface of the coil portion 12, an upper end of the outer wall portion 23*c*1, and an upper end of the inner wall portion 23*c*2.

A method for manufacturing the isolator 102 according to the embodiment will be described.

FIGS. 8A and 8B and FIGS. 9A and 9B are schematic views showing the method for manufacturing the isolator according to the embodiment.

Figure 8A:
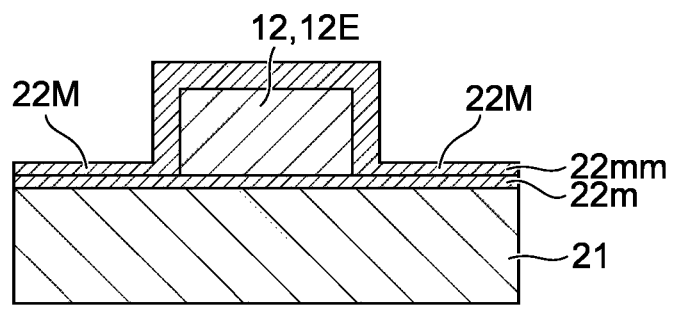
FIGS. 8A and 8B and FIGS. 9A and 9B are schematic views showing a method for manufacturing the isolator according to the second embodiment.

As shown in FIG. 8A, after the upper electrode 12E is formed on the high dielectric film 22*m* that is flat, a high dielectric film 22*mm* is further formed. The high dielectric film 22*mm* is formed on the high dielectric film 22*m* and the coil portion 12. Accordingly, the high dielectric film 22*m* in contact with the lower surface of the coil portion 12, the high dielectric film 22*mm* in contact with the outer side surface, the inner side surface, and the upper surface of the coil portion 12, a stacked high dielectric film 22M which is not in contact with the coil portion 12 and in which the high dielectric films 22*m* and 22*mm* are stacked are formed.

Figure 8B:
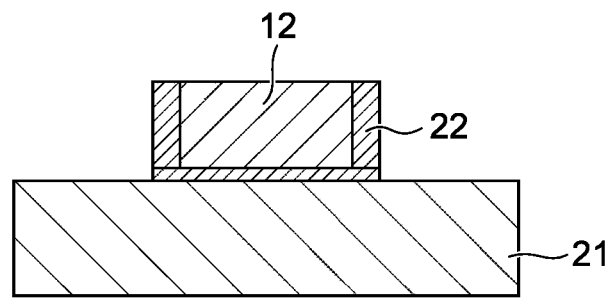

As shown in FIGS. 8A and 8B, anisotropic etching such as RIE is applied to the stacked high dielectric film 22M. Accordingly, a portion of the stacked high dielectric film 22M, which is in contact with the upper surface of the first insulating layer 21, and a portion of the high dielectric film 22*mm*, which is in contact with the upper surface of the coil portion 12, are removed, and a portion of the high dielectric film 22*m*, which is in contact with the lower surface of the coil portion 12, and a portion of the high dielectric film 22*mm*, which is in contact with the side surface of the coil portion 12, remain. In such a manner, the second insulating layer 22 is formed.

Figure 9A:
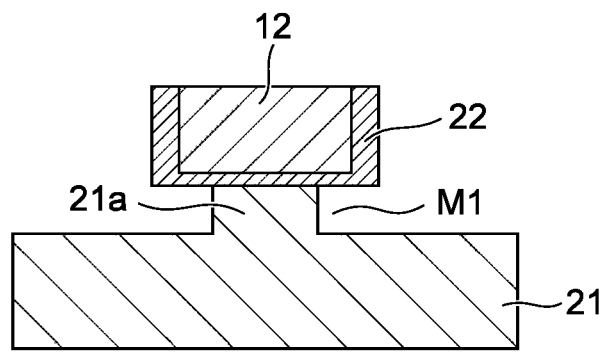

As shown in FIG. 9A, a part of the upper portion of the first insulating layer 21 is removed to form the protruding portion 21*a* in the upper portion of the first insulating layer 21 and form the grooves M1 by masking the upper electrode 12E and the second insulating layer 22 and applying isotropic etching such as wet etching to the first insulating layer 21.

Figure 9B:
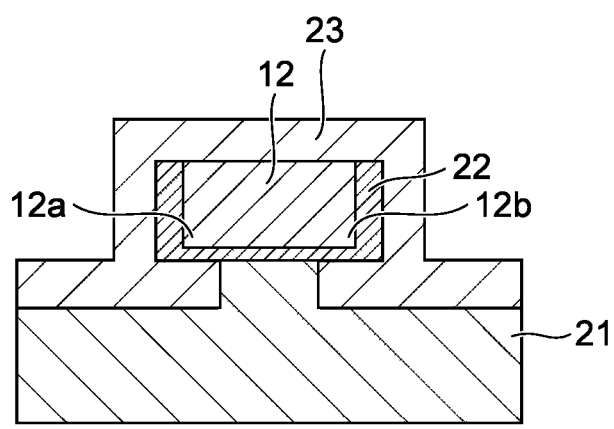

As shown in FIG. 9B, the third insulating layer 23 is formed on the first insulating layer 21, the second insulating layer 22, and the coil portion 12. The third insulating layer 23 is also formed inside the groove M1.

In the isolator 102 according to the embodiment, since the second insulating layer 22 having a high specific permittivity is provided on the outer side surface of the coil portion 12, the distribution of electric force lines emitted from the surfaces of the coil portion 12 changes. The electric force lines are more distributed in the second insulating layer 22 provided on the outer side surface of the coil portion 12 than in the isolator 101 according to the first embodiment, and are further reduced by that amount in the second insulating layer 22 provided on the lower surface of the coil portion 12. Accordingly, the electric field intensity in the region directly below the coil portion 12 is lowered, and the concentration of the electric field in the region directly below the outer lower corner portion 12*a* of the coil portion 12 can be further relaxed.

The second insulating layer 22 in the embodiment includes the outer wall portion 22*c* and the inner wall portion 22*d*, but is not limited thereto, and may not include the inner wall portion 22*d*.

One of the end portions 23*aa*1 and 23*aa*2 of the third insulating layer 23 in the embodiment may be the gap G1, and may contain a void in part.

Configurations, operations, and effects other than those described above in the embodiment are the same as those of the first embodiment.

Variation of Second Embodiment

The second insulating layer 22 of an isolator 102*a* according to the variation is in contact with the lower surface and the side surfaces of the coil portion 12, and the gaps G1 are disposed, as low permittivity portions, in the respective grooves M1.

Figure 10:
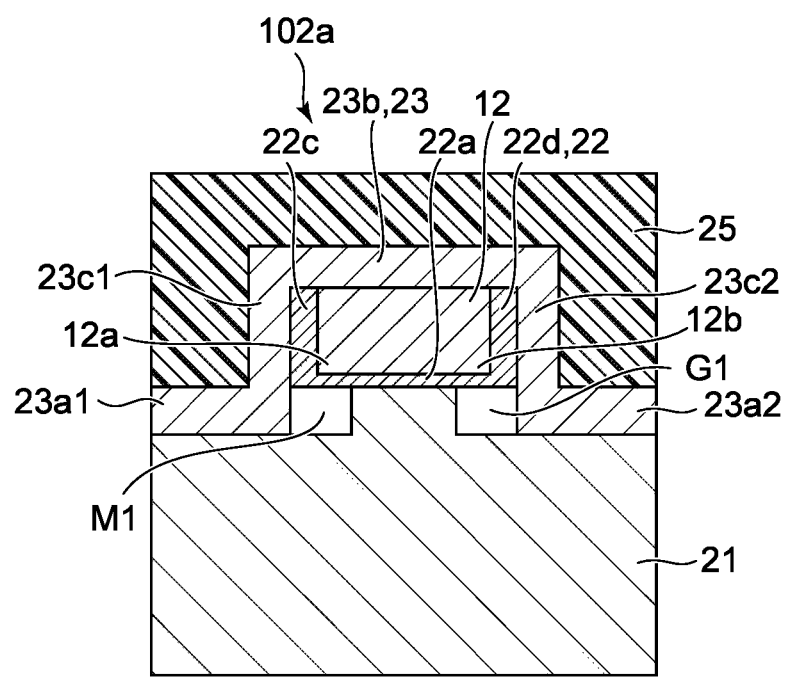
FIG. 10 is an enlarged cross-sectional view showing an isolator according to a variation of the second embodiment.

FIG. 10 is an enlarged cross-sectional view showing the isolator according to the variation.

Similar to the second embodiment, the second insulating layer 22 includes the bottom portion 22*a*, the outer wall portion 22*c*, and the inner wall portion 22*d*.

As shown in FIG. 10, the inner side surface of the outer bottom portion 23*a*1 of the third insulating layer 23 is in contact with the gap G1 on the outward side, and for example, is located in a region directly below an outer side surface of the bottom portion 22*a* of the second insulating layer 22 or slightly inward of the region directly therebelow.

The outer side surface of the inner bottom portion 23*a*2 of the third insulating layer 23 is in contact with the gap G1 on the inward side, and for example, is located in a region directly below an inner side surface of the bottom portion 22*a* of the second insulating layer 22 or slightly outward of the region directly therebelow.

The gap G1 on the outward side is provided in the region directly below the outer wall portion 22*c* of the second insulating layer 22 and the region directly below the outer lower corner portion 12*a* of the coil portion 12. Accordingly, the gap G1 on the outward side is provided slightly outward of the region directly below the outer lower corner portion 12*a* of the coil portion 12.

The gap G1 on the inward side is provided in the region directly below the inner wall portion 22*d* of the second insulating layer 22 and the region directly below the inner lower corner portion 12*b* of the coil portion 12. Accordingly, the gap G1 on the inward side is provided slightly inward of the region directly below the inner lower corner portion 12*b* of the coil portion 12.

In the isolator 102*a* according to the variation, since the second insulating layer 22 is formed to be in contact with the side surface and the lower surface of the coil portion 12, and the gaps G1 having a lower specific permittivity than the third insulating layer 23 are disposed in the respective grooves M1, similar to the second embodiment, the breakage of the outer lower corner portion 12a of the coil portion 12 can be suppressed.

In addition, since the width of the groove M1 is longer than that of the groove M1 of the first embodiment, the gap G1 is easily formed.

Configurations, operations, and effects other than those described above in the variation are the same as those of the second embodiment.

Third Embodiment

In an isolator 103 according to the embodiment, the protective insulating layer 25 is provided without providing the third insulating layer 23 on the upper surface 21B of the first insulating layer 21, and the gaps G1 are provided, as low permittivity portions, in the respective grooves M1.

Figure 11A:
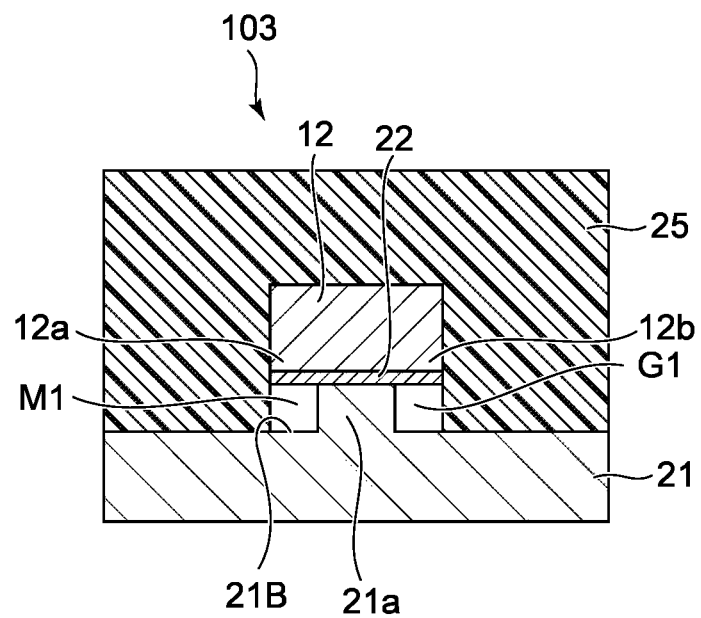
FIG. 11A is an enlarged cross-sectional view showing an isolator according to a third embodiment.

FIG. 11A is an enlarged cross-sectional view showing the isolator according to the embodiment.

As shown in FIG. 11A, the protective insulating layer 25 covers the first insulating layer 21, the gaps G1, the second insulating layer 22, and the coil portion 12, and is in contact with the upper surface 21B of the first insulating layer 21, the side surfaces of the gaps G1, the side surfaces of the second insulating layer 22, and the side surfaces and the upper surface of the coil portion 12.

The protective insulating layer 25 is provided in a region on the upper surface 21B of the first insulating layer 21 and excluding the region directly below the coil portion 12. A surface of the protective insulating layer 25, which is in contact with the gap G1 on the outward side, is located in the region directly below the outer side surface of the second insulating layer 22 or in the vicinity of the region directly therebelow. The gap G1 on the outward side is provided in the region directly below the outer lower corner portion 12a of the coil portion 12, and in detail, it is favorable that the gap G1 on the outward side is provided in the region directly below the outer side surface of the coil portion 12 and is also provided slightly outward of the region directly therebelow.

A surface of the protective insulating layer 25, which is in contact with the gap G1 on the inward side, is located in the region directly below the inner side surface of the second insulating layer 22 or in the vicinity of the region directly therebelow. The gap G1 on the inward side is provided in the region directly below the inner lower corner portion 12b of the coil portion 12 or in the vicinity of the region directly therebelow, and in detail, it is favorable that the gap G1 on the inward side is provided in the region directly below the inner side surface of the coil portion 12 and is also provided slightly inward of the region directly therebelow.

The protective insulating layer 25 in the embodiment is formed after the protruding portion 21a and the grooves M1 are formed. Since the protective insulating layer 25 containing, for example, polyimide has low coverage, the gap G1 is easily formed in the groove M1, the protective insulating layer 25 is unlikely to infiltrate into the groove M1, and the shape of the gap G1 is easily stabilized.

In the isolator 103 according to the embodiment, the gaps G1 can be provided by providing the protective insulating layer 25 without forming the third insulating layer 23. In addition, also in the embodiment, similar to the variation of the first embodiment, since the second insulating layer 22, the gap G1, and the first insulating layer 21 are provided directly below the outer lower corner portion 12a of the coil portion 12, the electric field in the region directly below the outer lower corner portion 12a can be relaxed, and the breakage of the coil portion 12 can be suppressed.

Configurations, operations, and effects other than those described above in the embodiment are the same as those of the first embodiment.

First Variation of Third Embodiment

In an isolator 103a according to the variation, the second insulating layer 22 is in contact with the lower surface and the side surfaces of the coil portion 12.

Figure 11B:
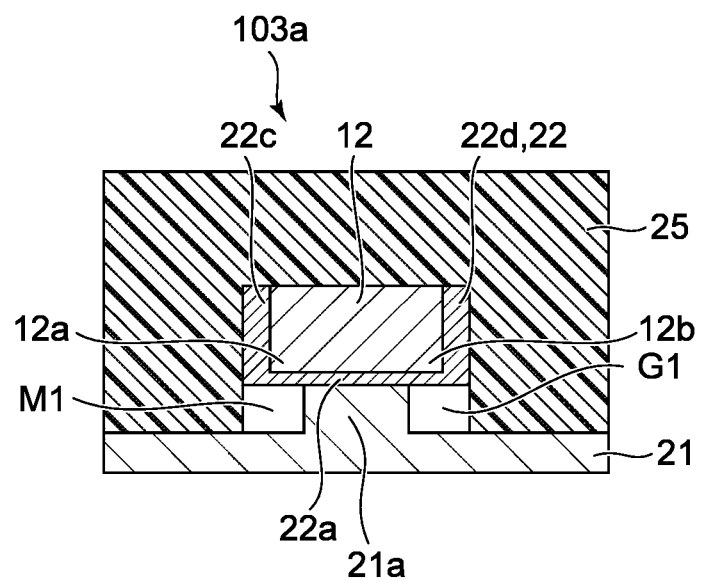
FIG. 11B is an enlarged cross-sectional view showing an isolator according to a variation of the third embodiment.

FIG. 11B is an enlarged cross-sectional view showing the isolator according to the variation.

Similar to the second embodiment, the second insulating layer 22 includes the bottom portion 22a, the outer wall portion 22c, and the inner wall portion 22d.

The protective insulating layer 25 is in contact with an outer side surface and an upper surface of the outer wall portion 22c and an inner side surface and an upper surface of the inner wall portion 22d in the second insulating layer 22, and the upper surface of the coil portion 12. The surface of the protective insulating layer 25, which is in contact with the gap G1, is located in the region directly below the side surface of the bottom portion 22a of the second insulating layer 22 or in the vicinity of the region directly therebelow.

Since the width of the groove M1 in the variation is larger than the width of the groove M1 of the third embodiment, when the protective insulating layer 25 slightly infiltrates into the groove M1, the protective insulating layer 25 can be effectively prevented from reaching the region directly below the outer lower corner portion 12a of the coil portion 12.

Also in the variation, similar to the variation of the second embodiment, the breakage of the coil portion 12 can be suppressed.

Configurations, operations, and effects other than those described above in the variation are the same as those of the third embodiment.

Second Variation of Third Embodiment

In an isolator 103b according to the variation, the first insulating layer 21 includes a new protruding portion 21aa, the second insulating layer 22 further includes a flange portion 22cc and a new bottom portion 22aa, and a new groove M2 and a new gap G2 are further provided.

Figure 12:
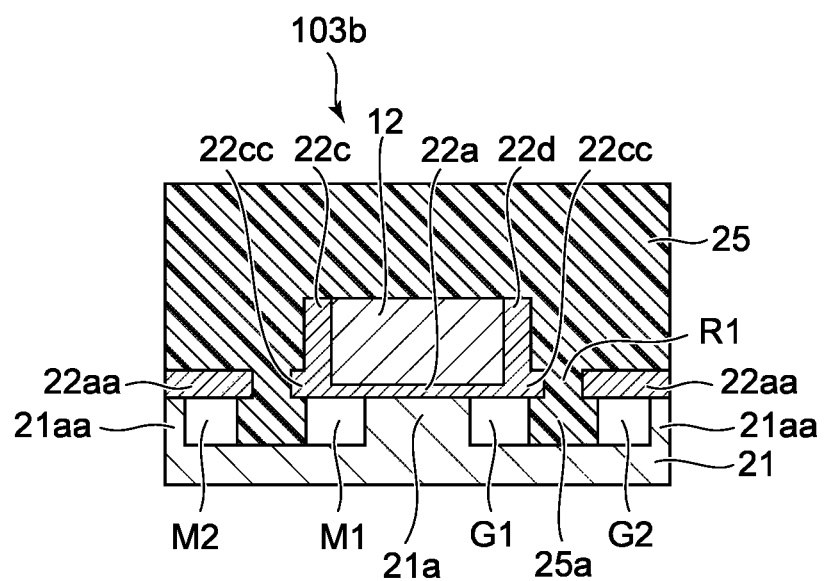
FIG. 12 is an enlarged cross-sectional view showing an isolator according to a second variation of the third embodiment.

FIG. 12 is an enlarged cross-sectional view showing the isolator according to the variation.

The new protruding portion 21aa of the first insulating layer 21 is provided in the upper portion of the first insulating layer 21, and forms a part of the upper surface 21B of the first insulating layer 21. The protruding portion 21aa is provided inward of the protruding portion 21a, and for example, the protruding portions 21aa are provided inward and outward of the protruding portion 21a.

As shown in FIG. 12, the new bottom portion 22aa of the second insulating layer 22 is provided on the protruding portion 21aa of the first insulating layer 21, and has a substantially thin plate shape extending sideways from a region directly above the protruding portion 21aa. The bottom portion 22aa is provided, for example, in the region directly below the coil portion 12.

The flange portion 22cc faces the new bottom portion 22aa with a hole R1 interposed therebetween. The flange portion 22cc provided on the outward side protrudes outward from a lower portion of the outer wall portion 22c and an outward end portion of the bottom portion 22a. The flange portion 22cc provided on the inward side protrudes inward from a lower portion of the inner wall portion 22d and an inward end portion of the bottom portion 22a. The thickness of the flange portion 22cc is larger than the thickness of the bottom portion 22a, and for example, is equal to or more than the thickness of the outer wall portion 22c or the inner wall portion 22d.

The groove M1 is a space surrounded by the lower surfaces of the bottom portion 22aa and the lower surfaces of the flange portion 22cc, the side surface of the protruding portion 21a, and a region on the upper surface 21B of the first insulating layer 21, the region being in contact with the side surface of the protruding portion 21a. The width of the groove M1 is longer than the width of the groove M1 in the second variation of the third embodiment, for example, by the width of the flange portion 22cc.

As shown in FIG. 12, the new groove M2 is a space surrounded by a lower surface of the bottom portion 22aa, a side surface of the protruding portion 21aa, and a region on the upper surface 21B of the first insulating layer 21, the region being in contact with the side surface of the protruding portion 21aa. The width of the groove M2 is substantially the same as the width of the groove M1.

The new gap G2 is provided in the groove M2. The gap G2 is provided outward of the protruding portion 21aa.

As shown in FIG. 12, the protective insulating layer 25 is also provided in the hole R1. The protective insulating layer 25 includes a bottom portion 25a. The bottom portion 25a is provided in a region directly below the hole R1 on the upper surface 21B of the first insulating layer 21. The bottom portion 25a is provided between the gap G1 and the gap G2 on the upper surface 21B of the first insulating layer 21. The bottom portion 25a faces the protruding portion 21a with the gap G1 interposed therebetween. A surface of the bottom portion 25a, which is in contact with the gap G1, is located, for example, in a region directly below a side surface of the outer wall portion 22c or a side surface of the inner wall portion 22d, and for example, is located in the vicinity of the region directly therebelow.

The bottom portion 25a is provided between the flange portion 22cc and the first insulating layer 21. The bottom portion 25a is provided in a region directly below the flange portion 22cc on the upper surface 21B of the first insulating layer 21. Since the bottom portion 25a is provided below the flange portion 22cc, the bottom portion 25a supports the second insulating layer 22 and the coil portion 12.

According to the above configuration, the protective insulating layer 25 is in contact with an upper surface, a side surface, and the lower surface of the flange portion 22cc of the second insulating layer 22, and is in contact with an upper surface, a side surface, and a part of the lower surface of the bottom portion 22aa.

Figure 13A:
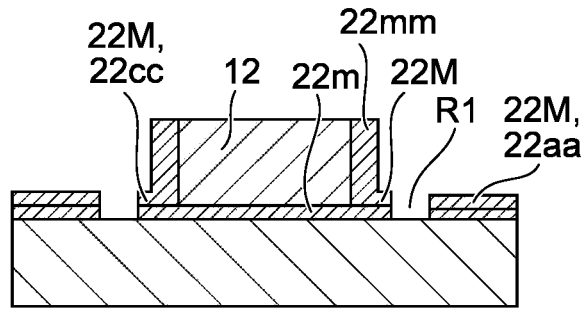
FIGS. 13A to 13C are schematic views showing a method for manufacturing the isolator according to the second variation of the third embodiment.
Figure 13B:
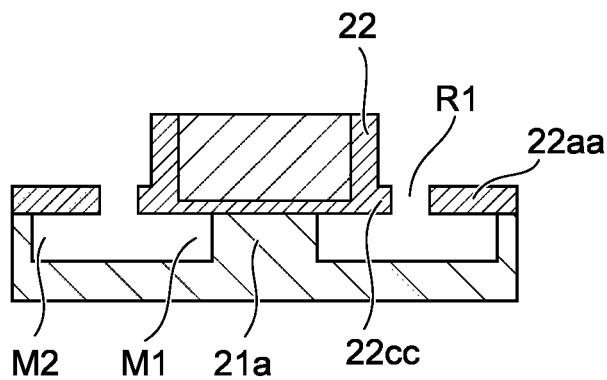
Figure 13C:
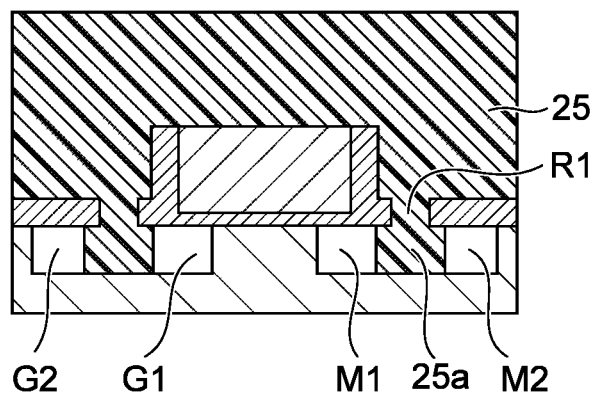

FIGS. 13A to 13C are schematic views showing a method for manufacturing the isolator according to the variation.

As shown in FIG. 13A, regarding the removal of the stacked high dielectric film 22M, unlike the second embodiment, a part of the stacked high dielectric film 22M is removed except for a portion contiguous to the coil portion 12. Accordingly, the hole R1 and the flange portion 22cc and the bottom portion 22aa of the second insulating layer 22 are formed in the second insulating layer 22.

As shown in FIG. 13B, a portion from the hole R1 to a part of the upper portion of the first insulating layer 21 is removed, for example, by wet etching. Accordingly, the protruding portion 21a and the grooves M1 and M2 are formed in the upper portion of the first insulating layer 21. In this stage, the groove M1 and the groove M2 communicate with each other.

As shown in FIG. 13C, the protective insulating layer 25 is formed. The bottom portion 25a of the protective insulating layer 25 is formed in the region directly below the hole R1 on the upper surface 21B of the first insulating layer 21 through the hole R1, and then is also formed in the hole R1.

Since the width of the groove M1 in the variation is larger than the width of the groove M1 in the first variation of the third embodiment, the bottom portion 25a of the protective insulating layer 25 provided in the groove M1 is provided in the region directly below the flange portion 22cc, and the protective insulating layer 25 can be effectively prevented from reaching the region directly below the outer lower corner portion 12a of the coil portion 12.

In addition, also in the variation, similar to the variation of the second embodiment, the breakage of the coil portion 12 can be suppressed.

In the variation, the coil portion 12 is not provided on the bottom portion 22aa of the second insulating layer 22, but the coil portion 12 may be provided. In this case, the outer lower corner portion 12a or the inner lower corner portion 12b of the coil portion 12 may be provided in a region directly above the gap G2.

Configurations, operations, and effects other than those described above in the variation are the same as those of the third embodiment.

According to the embodiments of the invention, it is possible to provide the isolator of which the reliability can be improved.

The embodiments of the invention have been described above with reference to specific examples. However, the embodiments of the invention are not limited to the specific examples. For example, the specific configurations, materials, or the like of the first insulating layer, the second insulating layer, the third insulating layer, the protective insulating layer, the upper electrode, and the lower electrode included in the isolator are included in the scope of the invention as long as persons skilled in the art can appropriately select the specific configurations, materials, or the like from the known scope to similarly implement the invention and obtain the same effects. A combination of two or more components of the specific examples within the technically feasible range is also included in the scope of the invention as long as the combination includes the concept of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An isolator comprising:
   a lower electrode;
   a first insulating layer being provided on the lower electrode, and including a protruding portion in an upper portion of the first insulating layer;
   a second insulating layer being provided on the protruding portion, extending sideways from a region directly above the protruding portion, and having a specific permittivity higher than a specific permittivity of the first insulating layer;

an upper electrode being in contact with an upper surface of the second insulating layer; and a low permittivity portion being in contact with a side surface of the protruding portion and a lower surface of the second insulating layer, and having a specific permittivity lower than the specific permittivity of the first insulating layer.

2. The isolator according to claim 1,
wherein the low permittivity portion is disposed in a region directly below a corner portion between a side surface and a lower surface of the upper electrode.

3. The isolator according to claim 1,
wherein the second insulating layer is in contact with a side surface of the upper electrode.

4. The isolator according to claim 1,
wherein the upper electrode and the lower electrode include respective coil portions.

5. The isolator according to claim 1,
wherein the low permittivity portion contains one or more materials selected from a group consisted of fluorinated silicon oxide, carbon-added silicon oxide, organic coated glass, an aromatic organic resin, and benzocyclobutene.

6. The isolator according to claim 5,
wherein the low permittivity portion is in contact with a side surface of the second insulating layer.

7. The isolator according to claim 1,
wherein the low permittivity portion is a gap.

8. The isolator according to claim 7, further comprising:
a third insulating layer containing one or more materials selected from a group consisted of fluorinated silicon oxide, carbon-added silicon oxide, organic coated glass, an aromatic organic resin, and benzocyclobutene, wherein the low permittivity portion is provided between the third insulating layer and the protruding portion, and the third insulating layer is in contact with a side surface of the second insulating layer.

9. The isolator according to claim 7, further comprising:
a protective insulating layer covering the upper electrode and the second insulating layer, being in contact with the first insulating layer and the low permittivity portion, and having a specific permittivity equal to or more than the specific permittivity of the first insulating layer and less than a specific permittivity of the second insulating layer.

10. The isolator according to claim 9,
wherein the second insulating layer includes a flange portion protruding sideways in a lower portion of the second insulating layer, and the protective insulating layer is provided between the flange portion and the first insulating layer.

11. The isolator according to claim 9,
wherein the protective insulating layer contains silicon oxide or polyimide.

12. The isolator according to claim 1,
wherein the first insulating layer contains silicon oxide or hydrogen and silicon oxynitride.

13. The isolator according to claim 1,
wherein the first insulating layer contains silicon and oxygen, and the second insulating layer contains silicon and nitrogen.

14. The isolator according to claim 1,
wherein a signal is transmitted or received by dielectric coupling or capacitive coupling between the lower electrode and the upper electrode.

* * * * *